United States Patent
Chang

(10) Patent No.: US 6,888,727 B2
(45) Date of Patent: May 3, 2005

(54) SATA MOBILE RACK WITH POWER CONTROL

(76) Inventor: Cheng Chun Chang, 11F-2, No. 11, Lane 202, Jing-Shing Road, Wen-Shan DT, Taipei (TW)

( * ) Notice: Subject to any disclaimer, the term of this patent is extended or adjusted under 35 U.S.C. 154(b) by 135 days.

(21) Appl. No.: 10/609,935

(22) Filed: Jun. 30, 2003

(65) Prior Publication Data

US 2004/0252468 A1 Dec. 16, 2004

(30) Foreign Application Priority Data

Jun. 16, 2003 (TW) ...................................... 92210933 U

(51) Int. Cl.$^7$ .............................. H05K 7/14; H05K 5/02
(52) U.S. Cl. ...................... 361/752; 361/796; 361/730; 361/685; 174/50.52; 174/52.1; 439/638
(58) Field of Search ................................ 361/728–730, 361/752, 796, 797, 724, 683–686; 174/52.1, 51, 50.52; 439/61, 638, 651–654

(56) References Cited

U.S. PATENT DOCUMENTS

| | | | | |
|---|---|---|---|---|
| 4,941,841 A | * | 7/1990 | Darden et al. ............... | 361/685 |
| 5,694,290 A | * | 12/1997 | Chang ......................... | 361/685 |
| 6,144,561 A | * | 11/2000 | Cannella et al. ............ | 361/796 |
| 6,231,145 B1 | * | 5/2001 | Liu ........................... | 312/332.1 |
| 6,377,448 B1 | * | 4/2002 | Liu et al. ..................... | 361/685 |
| 6,377,471 B1 | * | 4/2002 | Chong et al. ............... | 361/796 |
| 6,388,878 B1 | * | 5/2002 | Chang ......................... | 361/687 |
| 6,560,099 B1 | * | 5/2003 | Chang ......................... | 361/685 |
| 6,563,714 B2 | * | 5/2003 | Chang ......................... | 361/752 |
| 6,574,110 B1 | * | 6/2003 | Budinger et al. ........... | 361/729 |
| 6,639,792 B1 | * | 10/2003 | Chang ......................... | 361/685 |
| 6,719,591 B1 | * | 4/2004 | Chang ......................... | 439/638 |
| 6,735,080 B1 | * | 5/2004 | Chang ......................... | 361/695 |
| 6,743,354 B1 | * | 6/2004 | Evans et al. ................ | 210/164 |

* cited by examiner

Primary Examiner—Kamand Cuneo
Assistant Examiner—Dameon E. Levi
(74) Attorney, Agent, or Firm—Quintero Law Office

(57) ABSTRACT

A Serial ATA mobile rack is constructed to include a housing having a back panel; an adapter fixedly provided in the back panel of the housing, the adapter comprising a connector formed of a signal segment and a power segment, a signal line disposed at a back side thereof and electrically connected to the signal segment for signal input/output, and a power cord disposed at the back side and electrically connected to the power segment, the power cord having an electric plug; and a circuit board mounted in the back panel of the housing, the circuit board comprising a power input socket adapted to receive external power supply, a power output socket adapted to receive the electric plug of the power cord for power output to the power segment of the adapter; the housing accommodating an inner case holding a data storage device, and a power switch connected between the power input socket and the power output socket for power on/off control.

7 Claims, 4 Drawing Sheets

SATA MOBILE RACK WITH POWER CONTROL

BACKGROUND OF THE INVENTION

1. Field of the Invention

The present invention relates to a Serial ATA mobile rack for PC and, more particularly, to a SATA mobile rack with power control.

2. Description of the Related Art

SATA (Serial ATA) is the next generation storage interface standard for PC, designed to replace the Ultra ATA parallel interconnect cable with a much smaller, more flexible serial design. Various SATA interface peripheral apparatus have been developed. SATA mobile rack for PC is one of the designs. A SATA mobile rack is comprised of a 7-pin signal segment, and a 15-pin power segment. In order to prevent attenuation of signal or delay in transmission due to frequent connection and disconnection between the power segment and the signal segment, there are suppliers directly installing a SATA interface adapter in the back side of the housing of the mobile rack. After insertion of the inner case into the housing, the adapter is electrically connected to the signal and power connector of the data storage device in the inner case. Because the power segment of the adapter is directly connected to the data storage device, the SATA mobile rack does not provide the function of power control and/or operation status indication as an IDE interface type mobile rack does. Therefore, the user can not make sure if the data storage device is in the operation status or not when connecting or disconnecting the device.

SUMMARY OF THE INVENTION

The present invention has been accomplished under the circumstances in view. It is the main object of the present invention to provide a Serial ATA mobile rack, which eliminates the aforesaid drawbacks.

According to one aspect of the present invention, the Serial ATA mobile rack including a housing having a back panel; an adapter fixedly provided in the back panel of the housing, the adapter comprising a connector formed of a signal segment and a power segment, a signal line disposed at a back side thereof and electrically connected to the signal segment for signal input/output, and a power cord disposed at the back side and electrically connected to the power segment, the power cord having an electric plug; and a circuit board mounted in the back panel of the housing, the circuit board comprising a power input socket adapted to receive external power supply, a power output socket adapted to receive the electric plug of the power cord for power output to the power segment of the adapter; the housing accommodating an inner case holding a data storage device, and a power switch connected between the power input socket and the power output socket for power on/off control.

According to another aspect of the present invention, the power output socket has a first power pin and a grounding pin coupled to a power indicator for power on/off indication.

According to still another aspect of the present invention, the power output socket further comprises an Act_HDD signal pin and a second power pin coupled to a data storage device indicator for the indication of the on/off operation status of the data storage device of the inner case.

DETAILED DESCRIPTION OF THE PREFERRED EMBODIMENT

Figure 1:
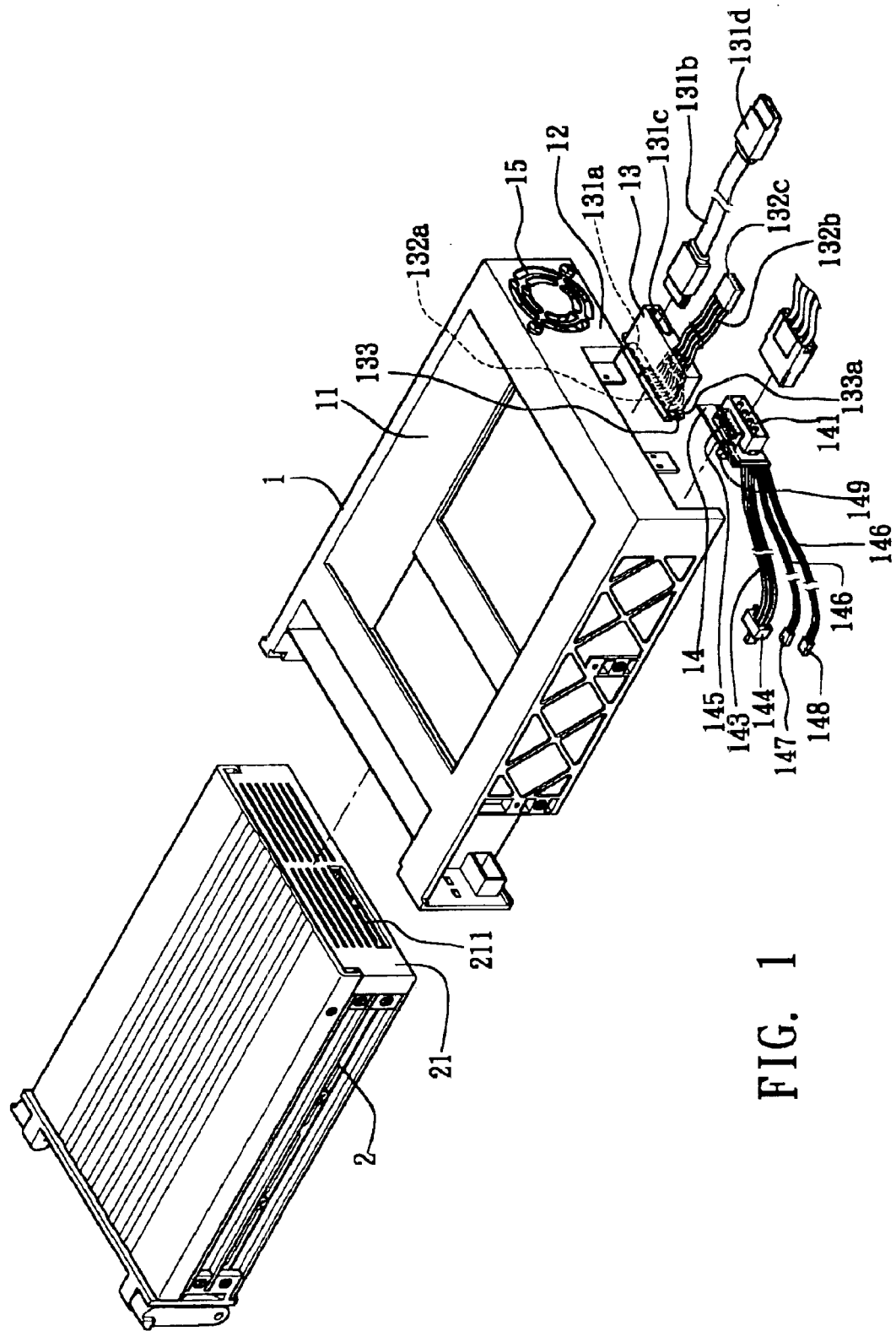
FIG. 1 is an exploded view of a SATA mobile rack according to the present invention.
Figure 2:
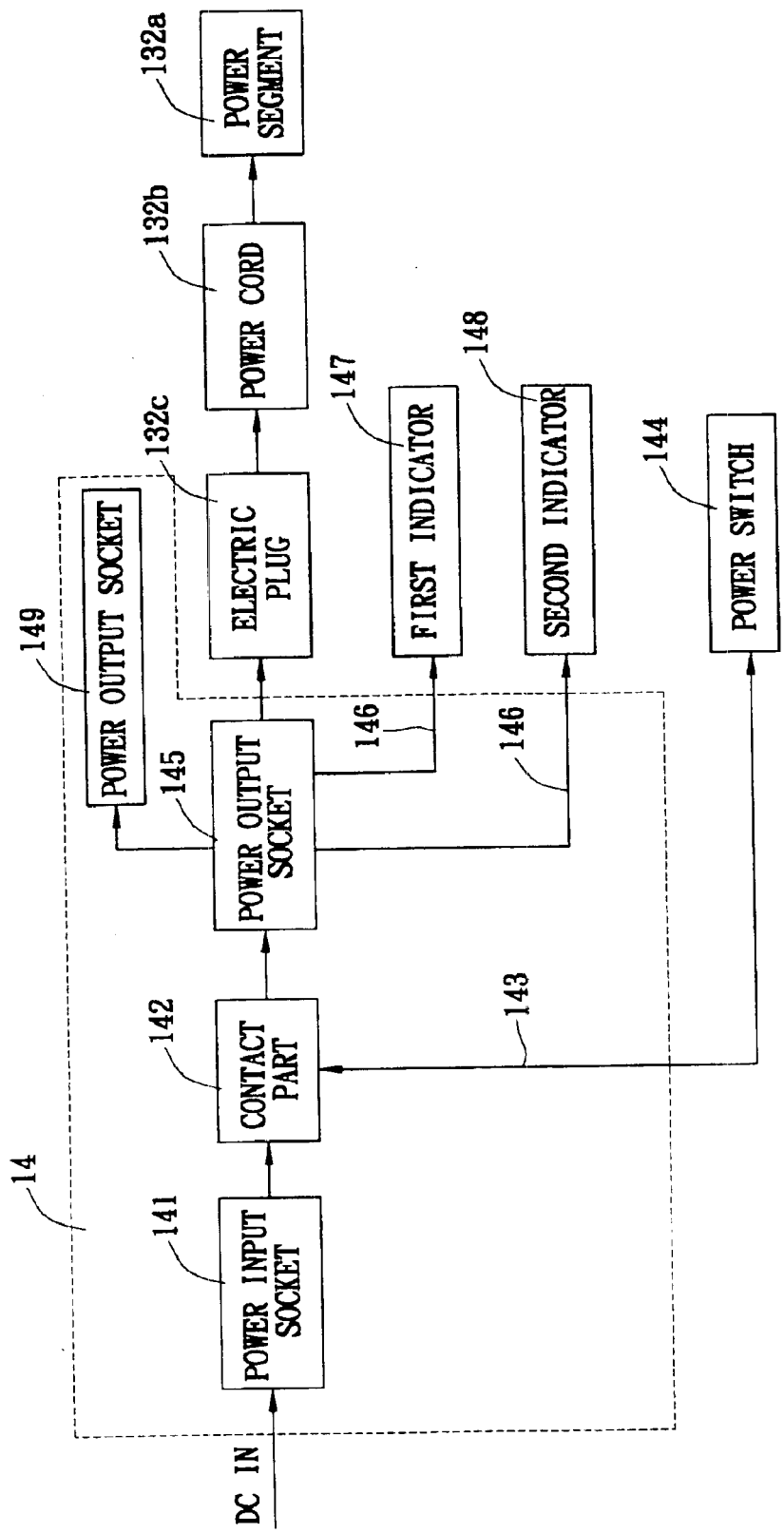
FIG. 2 is a circuit block diagram of the present invention.
Figure 3:
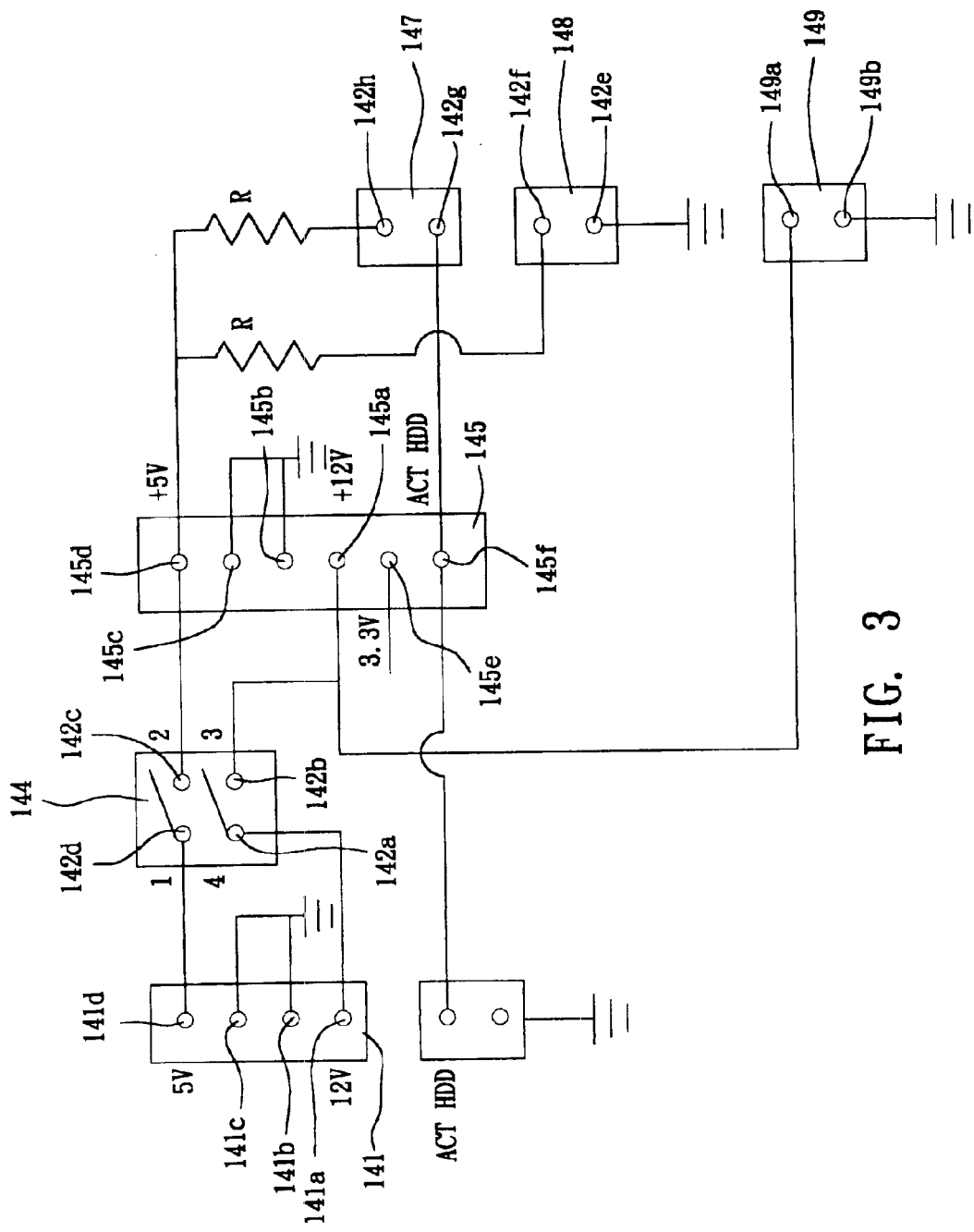
FIG. 3 is a detailed circuit diagram of the present invention.
Figure 4:
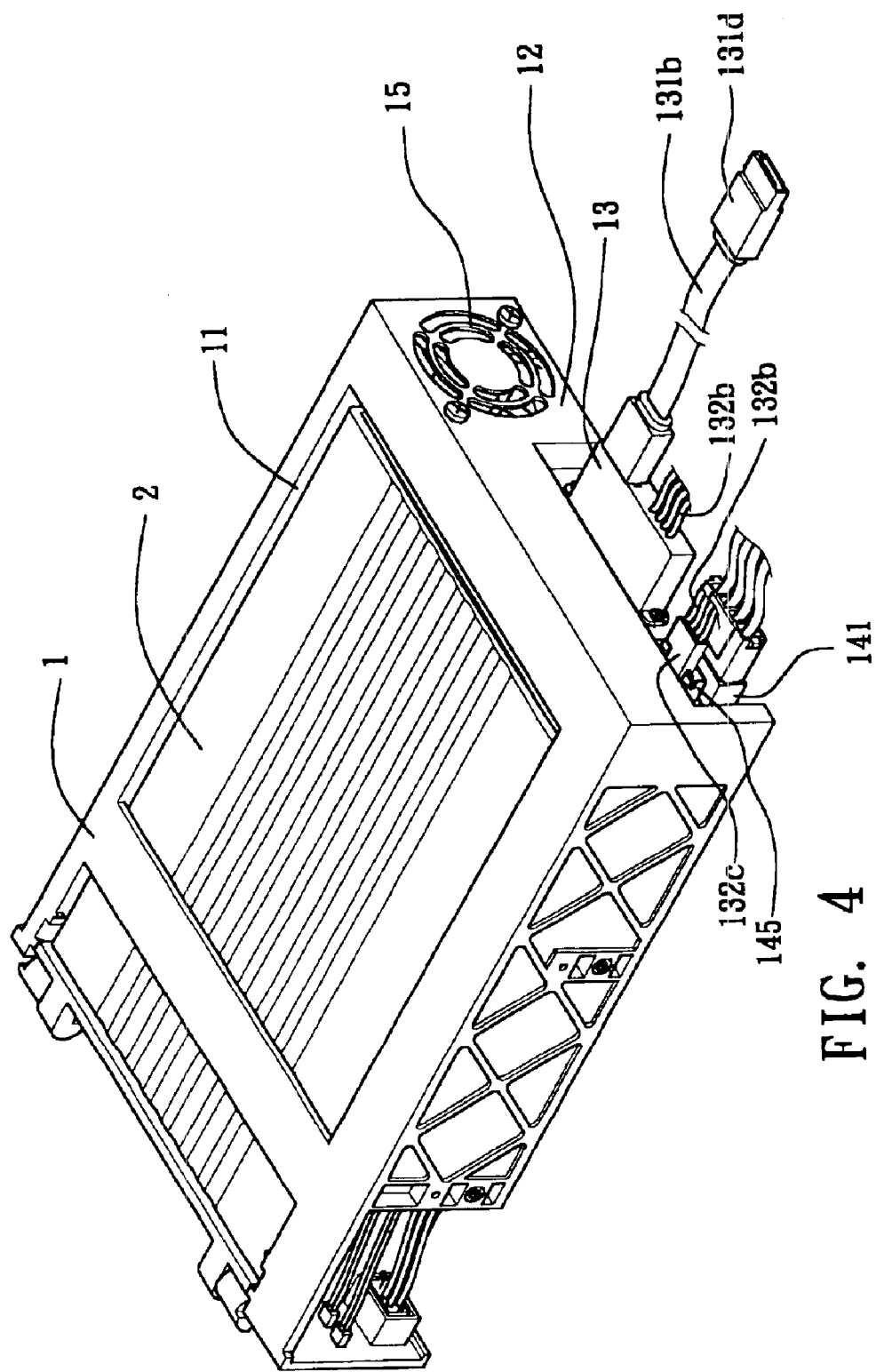
FIG. 4 is an elevational assembly view of the SATA mobile rack according to the present invention.

Referring to FIGS. 1~4, a SATA mobile rack in accordance with the present invention is shown comprised of a housing 1, and an inner case 2.

The housing 1 is a hollow frame rack mountable to a mounting space in a mainframe for personal computer, defining a chamber 11 adapted to accommodate the inner case 2. The housing 1 comprises a back panel 12, an adapter 13 fixedly provided in the back panel 12 corresponding to the connection port 211 in the back panel 21 of the inner case 2, and a circuit board 14 fixedly located on the back panel 12. The adapter 13 comprises a connector formed of a signal segment 131a and a power segment 132a and disposed at the inner side, a signal line 131b disposed at the back side and electrically connected to the signal segment 131a, and a power cord 132b disposed at the back side and electrically connected to the power segment 132a. The signal line 131b has a connector 131d for connection to the motherboard or one interface card of a personal computer. The power cord 132b has an electric plug 132c for connection to the circuit board 14 (this will be described latter).

Further, the adapter 13 has two mounting devices, for example, mounting flanges 133 disposed at two sides for mounting in the back panel 12 with screws or rivets. The adapter 13 can be made having a connector at the back side for the connection of the signal line 131b. Alternatively, the signal line 131b can be formed integral with the adapter 13.

The circuit board 14 comprises a power input socket 141 located on the outer side for the connection of the electric plug of a power adapter for power input. The pin 141a and pin 141d (12V and 5V) of the power input socket 141 are respectively electrically connected to the contact 142a and contact 142d of a contact unit 142 and then connected to a power switch 144 at the face panel of the housing 1 by electric wires 143, and other two electric wires 143 are connected to the other two contacts 142b and 142c, forming a control loop. The contacts 142b and 142c are electrically connected to the pins 145a and 145d of a power output socket 145, which is adapted to receive the electric plug 132c of the power cord 132b. The pins 141b, 141c, 145b and 145c are grounded. Therefore, switching the power switch 144 electrically connects/disconnects the power segment 132a.

The power output socket 145 further comprises a pin 145e for 3.3V, and a pin 145f for signal Act_HDD. The signal pin 145f is electrically connected to a contact 142g. The pin 145d is electrically connected to a contact 142h. The contacts 142g and 142h are connected to a first indicator, for example a LED 147 by electric wires 146, forming a loop. When accessing to the data storage device in the inner case 2, the LED 147 is turned on. Further, a contact 142f is electrically connected to the pin 145d to obtain 5V power. The contact 142e is grounded. The contacts 142e and 142f are electrically connected to a second indicator, for example, a LED 148 by electric wires 146, forming a loop. When power on, the LED 148 is turned on. On the contrary, when power off, the LED 148 is turned off.

The circuit board 14 further comprises a power output socket 149. The power output socket 149 has one pin 149a electrically connected to the pin 145a of the power output socket 145, and adapted to provide the necessary working voltage to a fan 15 at the back panel 12 of the housing 1. The other pin 149b of the power output socket 149 is grounded.

The inner case 2 has installed therein a SATA interface type data storage device, for example, hard disk. As stated before, the connection port 211 in the back panel 21 of the inner case 2 is adapted to receive the signal segment 131a and power segment 132a of the adapter 13.

As indicated above, the signal segment of the adapter is not connected to the inner case through the circuit board. It is directly connected to a personal computer through a signal line for stable transmission of data signal at a high speed. The power segment of the adapter is connected to a power output socket at the circuit board through a power cord. The circuit board has a power input socket for input of power supply into the power segment of the adapter. A power switch is installed in the face panel of the housing and electrically connected between the power input socket and power output socket of the circuit board for power on/off control. Further, the circuit board has connected thereto a first indicator and a second indicator for inner case data storage device power on/off and read/write status indications A prototype of SATA mobile rack has been constructed with the features of FIGS. 1~4. The SATA mobile rack functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A Serial ATA mobile rack including:

a housing having a back panel;

an adapter fixedly provided in the back panel of said housing, said adapter comprising a connector formed of a signal segment and a power segment, a signal line disposed at a back side thereof and electrically connected to said signal segment for signal input/output, and a power cord disposed at said back side and electrically connected to said power segment, said power cord having an electric plug; and a circuit board mounted in the back panel of said housing, said circuit board comprising a power input socket adapted to receive external power supply, a power output socket adapted to receive the electric plug of said power cord for power output to said power segment of said adapter;

whereby said housing accommodating an inner case holding a data storage device, and a power switch connected between said power input socket and said power output socket for power on/off control.

2. The Serial ATA mobile rack as claimed in claim 1, wherein said power output socket has a first power pin and a grounding pin coupled to a power indicator for power on/off indication.

3. The Serial ATA mobile rack as claimed in claim 2, wherein said power output socket further comprises an Act_HDD signal pin and a second power pin coupled to a data storage device indicator for indicating on/off operation status of the data storage device of said inner case.

4. The Serial ATA mobile rack as claimed in claim 1, wherein said signal line is formed integral with said adapter.

5. The Serial ATA mobile rack as claimed in claim 1, wherein said adapter further comprises a signal line connector electrically connected to said signal segment and adapted to receive said signal line.

6. The Serial ATA mobile rack as claimed in claim 1, wherein said inner case has a connection port adapted to receive said adapter for enabling the signal segment and power segment of said adapter to be electrically connected to said data storage device.

7. The Serial ATA mobile rack as claimed in claim 1, wherein said circuit board further comprises a second power output socket; said housing further comprises a fan electrically connected to said second power output socket.

* * * * *